United States Patent [19]

Lansford

[11] Patent Number: 4,960,443
[45] Date of Patent: Oct. 2, 1990

[54] PROCESS FOR SEPARATION OF HYDROCARBON VAPORS AND APPARATUS THEREFOR

[75] Inventor: Jerry R. Lansford, Longview, Tex.

[73] Assignee: Chevron Corporation, San Francisco, Calif.

[21] Appl. No.: 784,029

[22] Filed: Oct. 4, 1985

[51] Int. Cl.$^5$ .............................................. B01D 19/00
[52] U.S. Cl. ........................................... 55/45; 55/55; 55/189; 55/195; 203/91; 210/718
[58] Field of Search .................... 55/45, 55, 170, 172, 55/176, 189, 195; 203/91; 210/718

[56] References Cited

U.S. PATENT DOCUMENTS

| | | |
|---|---|---|
| Re. 27,309 | 3/1972 | Scott et al. . |
| 554,598 | 2/1896 | Gilmore ................................ 55/176 |
| 1,437,721 | 12/1922 | Clark . |
| 2,297,297 | 9/1942 | Walker . |
| 2,420,115 | 5/1947 | Walker et al. . |
| 2,614,649 | 10/1952 | Walker et al. . |
| 2,765,850 | 10/1956 | Allen . |
| 2,766,203 | 10/1956 | Brown et al. .................... 210/718 X |
| 3,242,643 | 3/1966 | Moore et al. . |
| 3,273,318 | 9/1966 | Meyer ................................ 55/176 X |
| 3,325,974 | 6/1967 | Griffin et al. . |
| 3,422,028 | 1/1969 | Perry ................................. 55/176 X |
| 3,789,579 | 2/1974 | El-Hindi . |
| 3,945,435 | 3/1976 | Barry . |
| 4,234,325 | 11/1980 | Rea . |
| 4,320,802 | 3/1982 | Garbo . |
| 4,369,049 | 1/1983 | Heath . |
| 4,371,383 | 2/1983 | Rost . |

OTHER PUBLICATIONS

Seminar by H. K. Van Poollen and Associates, Inc., "Gas-Oil Separator Systems", and Attendees List-Aug. 20-24, 1984.

*Primary Examiner*—Charles Hart
*Attorney, Agent, or Firm*—Roylance, Abrams, Berdo & Goodman

[57] ABSTRACT

Separation of hydrocarbon vapors from an admixture of hydrocarbon gases and hydrocarbon liquid is achieved by passing the admixture into the upper portion of a vapor rfecovery zone comprising a vertical, elongated separation zone, withdrawing hydrocarbon gases from an upper portion of the separation zone, the admixture being introduced into the vapor separation zone below the point at which the hydrocarbon gases are withdrawn from said separation zone.

The liquid introduced into the separation zone flows in a generally downward, vertical direction to a point in the lower portion of the vapor recovery zone, changing direction and flowing in an upward, substantially vertical direction forming a column of liquid. The is passed from the vertical liquid column to an oil retaining zone having an upper, gaseous zone and a lower liquid zone. The vertical liquid column maintains a seal between the gaseous zone of the oil retaining zone and the gas-containing upper portion of the separation zone.

13 Claims, 3 Drawing Sheets

PROCESS FOR SEPARATION OF HYDROCARBON VAPORS AND APPARATUS THEREFOR

BACKGROUND OF THE INVENTION

This invention relates to a process for the recovery of hydrocarbon gas or vapors from hydrocarbon liquids and to apparatus for effecting such recovery. More particularly, this invention relates to separation of entrained hydrocarbon gas from crude oil prior to passing the oil to storage.

In the past, crude oil withdrawn from an oil well has been passed to a heater treater or separator for separation of water and hydrocarbon vapors from the oil, and the oil is thereafter passed to oil storage tanks. Normally, there is a considerable amount of hydrocarbon vapors entrained in the oil passed from the heater treater to the storage tanks. When a certain preset or predetermined pressure is reached inside the storage tanks, the hydrocarbon vapors are released into the atmosphere resulting in waste as well as atmospheric pollution.

SUMMARY OF THE INVENTION

Surprisingly, a process and apparatus have been discovered which will enable collection of the hydrocarbon gases without their release to the atmosphere. The process of the present invention involves passing the oil containing entrained hydrocarbon gases from the heater treater to a vapor recovery unit in which the hydrocarbon gases can be separated from the oil and recovered without contamination of the oil or the gases, or pollution of the atmosphere.

The process of the present invention comprises passing a hydrocarbonaceous gas-liquid admixture into the upper portion of a vertical, elongated separation zone, and withdrawing hydrocarbon vapor from an upper portion of the vapor recovery zone. The admixture is introduced into the upper portion of the vapor recovery zone below the point at which said hydrocarbon vapors are withdrawn from said vapor recovery zone. The liquid fraction flows in a generally downward, vertical direction to a point in the lower portion of said vapor recovery zone, at which the liquid changes direction and then flows in an upwardly, substantially vertical direction in a manner such as to form a liquid seal as said liquid is passed from said vapor recovery zone. The liquid is then passed to a storage zone.

The vapor recovery unit of the present invention comprises an elongated, vertical separator having an inlet means for introducing the oil and entrained gas from the heater treater and an outlet means for passing the oil to the oil storage tanks, as well as a second outlet means for withdrawing the separated gas for passage to a gas treatment plant for compression and expansion to form liquefied petroleum gas (LPG). The vapor recovery unit of the present invention is provided with a "dip tube", which may be an internal dip tube or external dip tube. The liquid-vapor admixture must enter the vapor recovery unit at a height determined by the absolute pressure on the vapor line leaving the top of the vapor recovery unit and the specific gravity of the liquid. Likewise the height of the vapor recovery unit is determined by the absolute pressure on the vapor line leaving the top of the unit along with the specific gravity of the liquid. The liquid falls by gravity to the lower portion of the unit and then up the dip tube out of the vapor recovery unit into the flow line leading to the oil storage tanks. Alternatively, the vapor recovery unit may be designed having the dip tube on the outside of the unit. In this alternative, the liquid and vapor admixture flows from the heater treater into the vapor recovery unit and the resulting separated liquid flows out of the bottom of the unit into the dip tube located outside the unit and thereafter into the oil storage tanks. The purpose of the dip tube is to provide a means of transferring the liquid from the vapor recovery unit to the oil storage tanks while maintaining a liquid seal. The liquid seal prevents air from being pulled into the vapor line leaving the top of the vapor recovery unit.

DESCRIPTION OF THE PREFERRED EMBODIMENTS

Figure 1:
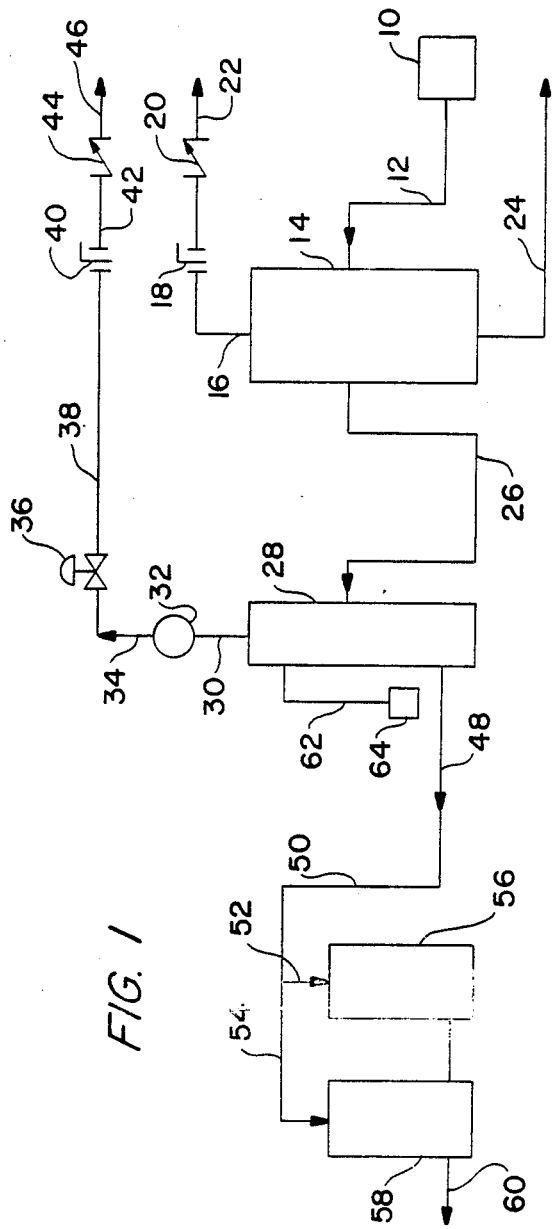
FIG. 1 is a schematic flow sheet illustrating the method and apparatus of the present invention.

Referring now to FIG. 1, an admixture of crude oil, hydrocarbon gas and water are withdrawn from crude oil producing well 10 and passed by means of flow line 12 to heater treater or separator 14 for removal of water. Heater treater 14 is provided with a heating element (not shown) for heating the admixture under a pressure of about 12 psig to about 30 psig to a temperature of from about 120° F. to about 140° F. so as to cause separation of water from the admixture, said water being removed by line 24. These conditions also result in vaporization of a portion of the $C_1$–$C_5$ hydrocarbons present in the crude oil. The $C_1$–$C_5$ gases are removed from heater treater 14 by means of line 16 through gas measuring meter 18, check valve 20 and line 22 by means of a vacuum in line 30. The gases withdrawn from line 22 are passed to a gas plant where the gas is liquefied and fractionated into various products, such as ethane-propane and butane-pentane fractions.

Next, oil containing entrained $C_1$–$C_5$ hydrocarbon gas is withdrawn from heater treater 14 by means of line 26 and is passed to vapor recovery unit 28 for separation of entrained gas from the oil. In vapor recovery unit 28, the entrained gas vapors are separated from the liquid and the gas is withdrawn from unit 28 by means of line 30 through compressor 32 and line 34 and is then passed through control valve 36 which may be used to maintain pressure in unit 28. Thereafter, the gas is passed by means of line 38 through gas meter 40, line 42, check valve 44 and line 46. The gas in line 46 is subjected to treatment identical to that of the gas withdrawn through line 22. Meanwhile, the separated oil in vapor recovery unit 28 is withdrawn by means of line 48 and passed through a "dip tube" configuration 50 and then by means of lines 52 and 54 into one or more oil storage tanks illustrated as oil storage tanks 56 and 58, respectively. Oil from storage tanks 56 and 58 is withdrawn by means of line 60 for disposition of the oil as desired.

Figure 2:
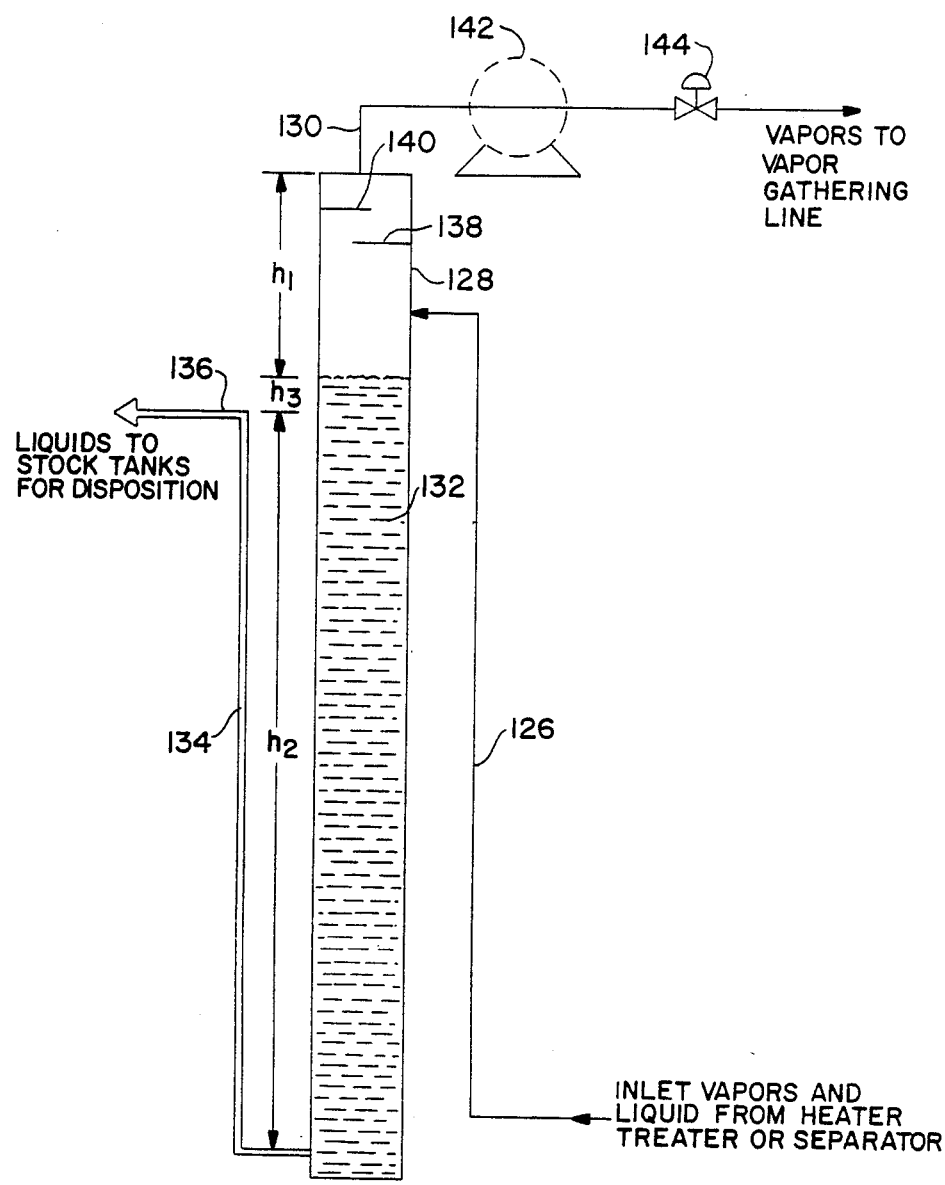
FIG. 2 illustrates the vapor recovery unit of the present invention having an external dip tube.

A preferred form the vapor recovery unit of the present invention is shown in FIG. 2 which substantially corresponds to vapor recovery unit 28 of FIG. 1. As shown in FIG. 2, hydrocarbon liquid and entrained vapor are passed by means of line 126 from the heater treater (not shown) to the vapor recovery unit 128. The liquid and vapor mixture enter the vapor recovery unit 128 above the liquid level in the unit at a height determined by the absolute pressure on the vapor line leaving the top of the vapor recovery unit and the specific gravity of the liquid. The liquid and vapor mixture can enter unit 128 below the liquid level in the unit, if desired. Likewise, the height of the vapor recovery unit is determined by the absolute pressure on the vapor line 130 leaving vapor recovery unit 128 and the specific gravity of the liquid 132. The liquid falls by gravity to the lower portion of the unit, passes from unit 128 and then passes up dip tube 134 into flow line 136 passing to the oil storage tanks as shown in FIG. 1.

Figure 3:
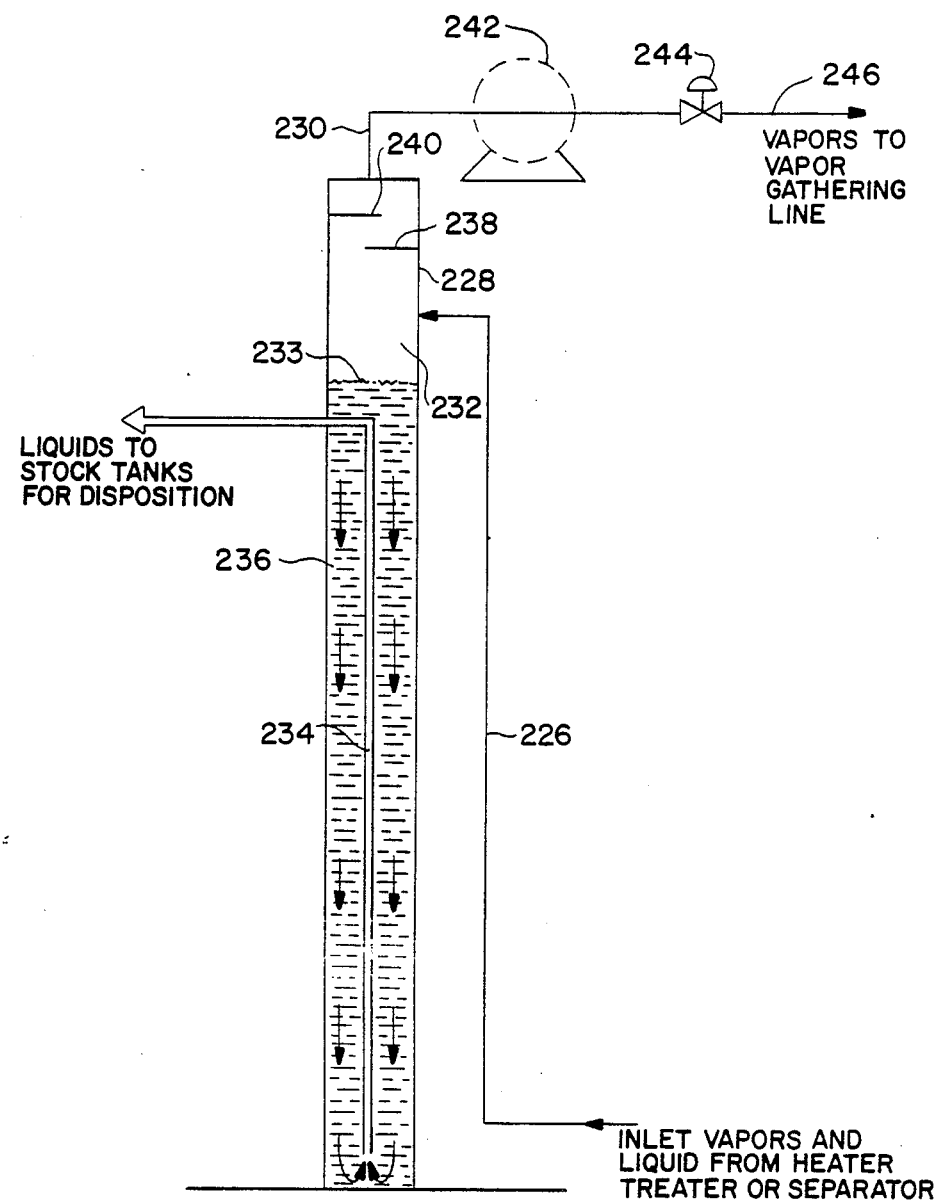
FIG. 3 illustrates the vapor recovery unit of the present invention having an internal dip tube.

An alternative vapor recovery unit of the present invention is shown in FIG. 3 in which vapor recovery 228 has dip tube 234 located inside the vapor recovery unit. The liquid and entrained vapors from the heater treater are introduced by means of line 226 in the same manner as the vapor recovery unit of FIG. 2 and the vapors are withdrawn by means of line 230 in the same manner as that shown in FIG. 2. The liquid passes downward by gravity as shown by the arrows, but must pass upwardly through the internal dip tube 234 to leave the vapor recovery unit and pass to the oil storage tanks. By providing the dip tube outside the vapor recovery unit as shown in FIG. 2, the diameter of the vapor recovery unit may be made smaller.

The dip tube is a hollow elongated tube whose purpose is to provide a means of transferring the hydrocarbon oil fraction from the vapor recovery unit to the oil storage tanks while maintaining a liquid seal. The dip tube has an inside diameter equal to or greater than that of line 126 of FIG. 2. This liquid seal prevents air from being pulled from the oil storage tanks back into the vapor recovery unit and into the vapor line to 130 of FIG. 2 resulting in a potentially explosive gas-oxygen mixture. The dip tube is shown as a generally L-shaped (FIG. 3) or Z-shaped (FIG. 2) conduit and is substantially the vertical portion of conduit 134 (FIG. 2) or conduit 234 (FIG. 3) through which liquid passes upwardly after having flowed downwardly through the vapor recovery unit by gravity. Thus, the dip tube provides a seal in the form of a vertical column of liquid.

As seen in FIG. 3, a vapor fraction is present in the space 232 above the liquid level 233 of the liquid fraction 236. Upon entering the vapor recovery unit the gas-liquid admixture entering unit 228 from line 226 separates into a gaseous fraction which passes upwardly through the upper section of the unit 232 which contains baffles 238 and 240, which help prevent entrained liquids from passing into line 230 along with the gaseous hydrocarbon fraction.

Depending upon the particular system, either a vacuum may exist in line 230 or a positive pressure may exist in line 230. When a positive pressure exists in line 230, a compressor or pump 242 may be provided to assist in recovering more vapors from unit 228 and boosting the vapors to desired line pressure. Additionally, pressure control valve 244 may be utilized in vapor line 246 to maintain the desired pressure on line 230 and in unit 228 which aids in controlling level 233 in unit 228.

Referring once again to FIG. 2 a height, $h_1$ is shown, which is the distance from the liquid level to the top of the vapor recovery unit. The height, $h_1$, is the minimum height required for the vapor recovery unit to extend above the liquid level inside the vapor recovery unit. Thus height, $h_3$, must be sufficient to insure that the force of gravity on the liquid is greater than the difference between the absolute pressure in the gas space in the oil storage tanks and the absolute pressure which exists in line 130, along with pressure losses in the dip tube and the line leading from the dip tube to the oil storage tanks (lines 52 and 54 in FIG. 1). This minimum height, $h_1$, prevents liquid from being pulled from the vapor recovery unit 128 into the gas gathering line 130 in the event that the absolute pressure in line 130 is less than the pressure inside the oil storage tanks. The liquid level inside the vapor recovery unit varies according to the pressure of the liquid entering the vapor recovery unit through line 126 from the heater treater and according to the height of the dip tube 134, as well as the absolute pressure in line 130 and according to the pressure loss due to friction in dip tube 134 and the line from the dip tube to the oil storage tanks, i.e., line 136 to the oil storage tanks.

The height of the liquid inside vapor recovery unit 128 will be at least as high as the dip tube height $h_2$. Because of frictional losses in dip tube 134, and in the line 136 leading from the dip tube to the oil storage tanks, this liquid level will be slightly higher than the highest point of the liquid in the dip tube.

Surprisingly, the pressure losses due to friction in dip tube 134 and the line leading from the dip tube to the oil storage tanks is significant. In view of this frictional pressure loss, a control valve 144 may be utilized to ensure that the back pressure on the vapor recovery unit 128 from the process line 130 along with the force of gravity on the liquid is greater than the pressure inside the oil storage tanks. This prevents liquid from entering line 130 from the vapor recovery unit.

Additionally, in accordance with a preferred embodiment of the present invention, a high liquid level shutdown device 62 shown in FIG. 1 may be utilized to prevent liquid from entering line 30 from vapor recovery unit 28. In the event that the liquid level rises and reduces the height $h_1$ of the space above the liquid level in vapor recovery unit 28 below the minimum desired, liquid flows into shutdown tube 62 and trips a switch 64 which causes termination of the flow of liquid and gas to the vapor recovery unit 28 from heater treater 14 through line 26 (by means not shown).

Referring again to FIG. 2, height $h_2$, which is the length of the dip tube 134 is shown. This height, $h_2$, is the minimum length of the dip tube, whether an internal or an external dip tube, which is positioned below the point where the liquid enters the oil storage tanks from the vapor recovery unit. The height $h_2$ is sufficient to ensure that the pressure required to force the liquid out of the dip tube and into the oil storage tanks, along with the pressure losses due to friction, is greater than the difference between the absolute pressure inside the oil storage tanks and the absolute pressure in vapor removal line 130. In other words, the dip tube length must be of sufficient height to ensure that the pressure differential between the pressure in the oil storage tanks and the vapor take off line 130 will not permit air to be drawn into the gas gathering line 130.

In order to further illustrate the present invention, the following non-limiting examples are presented for purposes of illustration.

Example 1

The following calculations were made in order to determine the minimum height $h_3$ for the vapor recovery unit of FIG. 2 assuming a vacuum in line 130 of 2 inches of Mercury.

In the following equations
$P_t$ = pressure inside the storage tanks
$P_a$ = atmospheric pressure = 14.65 psia
$\rho$ = density of the liquid = 49.92 lb./ft$^3$
x = vacuum in inches of Mercury
g = 32.2 ft/s$^2$
$g_c$ = 32.2 lb$_m$·ft./lb$_f$·S $$P_t \leq P_s + \rho g h/g_c$$
$$P_a \leq P_s + \rho g h/g_c$$
$$P_a - P_s \leq \rho g h/g_c$$
$$h \geq (P_a - P_s) g_c/\rho g$$
$$P_s = P_a = x$$
$$h > [P_a - (P_a - x\, 0.491)]\, g_c/\rho g$$
$$h > x\,(.491)\, g_c/\rho g$$
$$h = 2.8 \text{ ft.} = 3f$$
$$P_t = P_a = \text{atmospheric pressure}$$
$$P_s - 14.65 - 2''\text{Hg} = 0.491 \text{ psi}$$
$$P_s = 14.65 - 0.491 \frac{\text{psi}}{\text{inHg}} (2\text{inHg}) = 13.67$$

Thus, for a vacuum of 2 inches of Mercury in line 130 of FIG. 2, the height $h_3$ must be at least about 3 feet. The aforesaid calculation assumes that pressure loss due to friction in the dip tube and connecting lines is negligible.

Example 2

This example illustrates the calculation for the height, $h_2$, of the dip tube 134 in FIG. 2 assuming a positive pressure in gathering line 130 of one psig. The constituents of the following equations have been defined in Example 1, except $P_g$ = the pressure in line 130 in psig:

$$\frac{\rho g h}{g_c} + P_s \leq P_t = P_a$$

$$\frac{\rho g h}{g_c} \leq P_t - P_s < P_a - P_s$$

$$h \leq (P_a - P_s) g_c/\rho g$$

$$h \geq (P_s - P_a) g_c/\rho g \quad P_s = P_a + P_g$$

$$h \geq (P_a + P_g - P_a) g_c/\rho g$$

$$h \geq P_g g_c/\rho g$$

$$h \geq 2.9 \text{ ft.}$$

Thus, if for a positive presence of one psig, the dip tube should be 2.9 feet in vertical height to provide a suitable liquid seal.

We claim:

1. A process for the separation of hydrocarbon vapors from an admixture of hydrocarbon gases and hydrocarbon liquid which comprises passing said admixture into the upper portion of a vapor recovery zone comprising a vertical, elongated separation zone, withdrawing hydrocarbon gases from said upper portion of said upper portion of said separation zone into a vapor line, said vapor line being provided with a pressure control valve means, said admixture being introduced into said vapor separation zone below the point at which said hydrocarbon gases are withdrawn from said separation zone, said liquid introduced into said separation zone forming a first vertical liquid column beneath said vapor recovery zone, said liquid flowing in a generally downward, vertical direction to a point in the lower portion of said vapor recovery zone, changing direction and then flowing in an upward, substantially vertical direction forming a second vertical column of liquid, passing said liquid from said second vertical liquid column to an oil retaining zone having an upper, gaseous zone and a lower liquid zone, said second vertical liquid column maintaining a seal between said gaseous zone of said oil retaining zone and the gas-containing upper portion of said separation zone, the height of said first vertical liquid column being at least $h_3$ feet greater than the height of said second vertical liquid column, wherein $h_3$ has the value $$h_3 \geq x\,(0.491) g_c/\rho g$$

and said second vertical liquid column has a height, $h_2$, wherein $h_2$ has the value $$h_2 \geq P_g g_c/\rho g$$

wherein
$\rho$ = density of said hydrocarbon liquid in lb./ft$^3$
x = vacuum in inches of mercury in said vapor line which determines the height of $h_3$
g = 32.2 ft./s$^2$
$g_c$ = 32.2 lb$_m$·ft./lb$_f$·s and
$P_g$ = pressure in said vapor line in pounds per square inch
which determines the height $h_2$.

2. The process of claim 1 wherein said liquid flows in said upwardly, substantially vertical direction in a dip tube zone surrounded by said downwardly flowing liquid, prior to being discharged from said vapor recovery zone.

3. The process of claim 1 wherein said liquid flowing in an upwardly, substantially vertical direction is introduced into the upper portion of said oil retaining zone such that the inlet to said oil retaining zone is vertically above said point at which said liquid changes direction such that a liquid seal is formed.

4. The process of claim 1 wherein said vapor recovery zone is provided with baffle means in said upper portion of said separation zone for removal of entrained liquid from gas withdrawn from said vapor recovery zone.

5. The process of claim 4 wherein the minimum height of said vapor zone above the liquid level in said vapor recovery zone is sufficient to prevent liquid from being discharged with said vapors.

6. The process of claim 2 wherein said dip tube zone is located below the liquid level in said vapor recovery zone and is of sufficient height to maintain a liquid seal.

7. The process of claim 1 wherein said hydrocarbon liquid-hydrocarbon vapor admixture feed to said vapor recovery unit is a liquid/vapor admixture withdrawn from a heater treater in which water, gas and oil has been separated.

8. The process of claim 1 wherein said vapor recovery zone is provided with a shutdown means for terminating flow of liquid and gases to said vapor recovery zone liquid level in said vapor recovery zone rises above determined height, said shutdown means comprising a discharge means for removing liquid from said vapor recovery unit above said minimum height and a switching means to terminate the flow of said liquid and gases fed to said vapor recovery zone.

9. A vapor recovery means for separating hydrocarbon vapors from admixture with hydrocarbon liquid comprising an elongated, vertical vessel having a gas discharge means in the upper portion thereof and a feed inlet means below said gas discharge means in the upper portion of said vessel, said upper portion of said vessel being provided with baffle means, said upper portion of said vessel communicating with a vapor removal conduit, said vapor removal conduit being provided with a pressure control valve means, the lower portion of said vessel being provided with a vertically disposed, hollow conduit means disposed within said vessel having its upper terminus below said inlet means and its lower terminus above the bottom of said vessel, said vertically disposed, hollow conduit means communicating with an outlet means for removal of liquid from mid vessel, said vertically disposed, hollow conduit means being disposed within said vessel such that hydrocarbon liquid entering said vessel can flow downwardly around said conduit means and enter the bottom of said conduit means, passing upwardly through said conduit means and then pass from said vessel, said hydrocarbon liquid forming a vertical liquid column beneath said baffle means, the height of said vertical liquid column being at least $h_3$ feet greater than the height of said hollow conduit means, wherein $h_3$ has the value $$h_3 \geq x\,(0.491)g_c/\rho g$$

and said hollow conduit means has a height, $h_2$, wherein $h_2$ has the value $$2 \geq P_g\, g_c/\rho g$$

wherein
$\rho$ = density of said hydrocarbon liquid in lb./ft$^3$
$x$ = vacuum in inches of mercury in said vapor removal conduit which determines the minimum height for $h_3$
$g = 32.2$ ft./s$^2$
$g_c = 32.2$ lb$_m \cdot$ ft./lb$_f$s
$P_g$ = pressure in said vapor removal conduit in pounds per square inch which determines the height $h_2$.

10. The vapor recovery means of claim 9 wherein said hollow conduit means has a generally inverted L configuration.

11. The vapor recovery means of claim 9 wherein said outlet means communicates with an oil storage means.

12. The vapor recovery means of claim 9 wherein said outlet means communicates with an oil storage means.

13. A vapor recovery means comprising an elongated vertical vessel having a gas discharge means in the upper portion thereof and a feed inlet means below said gas discharge means in the upper portion of said vessel, said upper portion of said vessel being provided with baffle means, said upper portion of said vessel communicating with a vapor removal conduit, said vapor removal conduit being provided with a pressure control valve means, the lower portion of said vessel being provided with a vertical liquid column formed of hydrocarbon liquid below said baffle means, said vertically disposed liquid column communicating with an outlet means for removal of liquid from a lower portion of said vessel, said outlet means communicating with a vertically disposed, hollow conduit means disposed outside of said vessel such that liquid entering said vessel can flow downwardly in said vessel, out said outlet means, enter the bottom of said conduit means, pass upwardly through said vertically disposed hollow conduit means and then pass from said conduit means, the height of said vertical liquid column being at least $h_3$ has the value $$h_3 \geq x\,(0.491)g_c/g$$

and said second vertical liquid column has a height, $h_2$, wherein $h_2$ has the value $$h_2 \geq P_g g_c/\rho g$$

wherein
$\rho$ = density of said hydrocarbon liquid in lb./ft$^3$
$x$ = vacuum in inches of mercury in said vapor line which determines the minimum height for $h_3$
$g = 32.2$ ft./s$^2$
$g_c = 32.2$ lb$_m \cdot$ft./lb$_f$s
$P_g$ = pressure in said vapor line in pounds per square inch which determines the height $h_2$.

* * * * *